United States Patent [19]

Shepherd

[11] Patent Number: 6,025,058
[45] Date of Patent: Feb. 15, 2000

[54] COMPOSITE PLASTICS FILM OR SHEET

[75] Inventor: John Victor Shepherd, Essex, United Kingdom

[73] Assignee: Arjobex Limited, United Kingdom

[21] Appl. No.: 08/804,886

[22] Filed: Feb. 24, 1997

Related U.S. Application Data

[63] Continuation of application No. 08/516,757, Aug. 18, 1995, abandoned.

[30] Foreign Application Priority Data

Sep. 26, 1994 [GB] United Kingdom ................... 9419386

[51] Int. Cl.$^7$ ............................... B32B 27/32; B32B 5/22
[52] U.S. Cl. ......................... 428/215; 428/515; 428/516; 428/308.4; 428/315.7; 428/317.7; 428/317.9; 428/318.4; 428/319.3; 428/319.9; 427/533; 427/535; 264/173.12; 264/173.15; 264/173.14; 264/173.19; 264/290.2
[58] Field of Search ........................ 264/173.12, 173.15, 264/173.14, 290.2, 173.19; 427/533, 535; 428/515, 516, 215, 318.4, 319.3, 319.9, 304.4, 315.7, 308.4, 317.9

[56] References Cited

U.S. PATENT DOCUMENTS

| | | | |
|---|---|---|---|
| 3,783,088 | 1/1974 | Yoshiyasu et al. | 428/315.4 |
| 4,067,938 | 1/1978 | Jack | 264/41 |
| 4,472,227 | 9/1984 | Toyoda et al. | 156/244.11 |
| 4,567,089 | 1/1986 | Hattori et al. | 428/213 |
| 4,960,637 | 10/1990 | Biczenczuk | 428/314.4 |
| 5,326,391 | 7/1994 | Anderson et al. | 106/409 |
| 5,393,603 | 2/1995 | Toyoda et al. | 428/316.6 |

FOREIGN PATENT DOCUMENTS

| | | |
|---|---|---|
| 0347745 | 12/1989 | European Pat. Off. . |
| 0470760 | 2/1992 | European Pat. Off. . |
| 0623452 | 11/1994 | European Pat. Off. . |
| 1779874 | 7/1967 | Germany . |
| 4027544 | 5/1990 | Japan . |
| 2099754 | 12/1982 | United Kingdom . |
| 1362457 | 8/1994 | United Kingdom . |
| 9200188 | 1/1992 | WIPO . |

*Primary Examiner*—Paul Thibodeau
*Assistant Examiner*—D. Lawrence Tarazano
*Attorney, Agent, or Firm*—Morgan & Finnegan, L.L.P.

[57] ABSTRACT

This invention relates to a co-extruded film or sheet comprising a base layer and at least one surface layer, characterised in that the base layer comprises a polyolefin and has a thickness greater than about 10 $\mu$m, and the surface layer comprises a polyolefin and a silica filler and has a thickness less than about 5 $\mu$m. The surface layer contains from 10 to 60% w/w of silica based on the polyolefin content of said surface layer. Films and sheets of this type have superior absorbent properties for imprinting media such as eg ink.

21 Claims, No Drawings

COMPOSITE PLASTICS FILM OR SHEET

This application is a continuation of application Ser. No. 08/516,757, filed Aug. 18, 1995 now abandoned.

The present invention relates to a composite plastics film or sheet having an external printable surface for use as a synthetic paper or for coating to produce a synthetic paper and to a method for its production.

The term "synthetic paper" is used herein and throughout the specification to mean plastics film and sheet products having a feel and printability similar to cellulose paper.

Synthetic papers have been produced commercially by the plastics industry for many years and have taken a number of different forms. The have included products having voided (ie multicellular) or unvoided structures, some of which have been coated with filler- and/or pigment-containing surface coatings to improve printing qualities.

Descriptions of plastics compositions and methods for producing synthetic papers based on polyolefins can be found in our prior published GB-A-1470372, GB-A-1492771 and GB-A-1490512. Further, a description of particularly advantageous coatings can be found in our prior published GB-A-2177413. The concepts of all the aforementioned specifications are included herein by reference.

It has been recognised that plastics sheet of these types can provide an improved alternative to paper where durability and toughness are required. Plastics sheets produced from polyolefins have several advantages over other plastics since they offer UV resistance, good tear strength and the ability to be recycled in many post-consumer waste applications. As mentioned above, fillers are used in films/sheets intended for printing to provide an appropriate opaque white surface. These fillers are usually selected from inert minerals such as chalk or clay. In addition, minor additives are also used to render the film/sheet anti-static and/or to lower its density.

It is well recognised that polyolefin films have low surface energies and this generally means that printing is difficult because the ink does not readily wet out the surface and the dried ink does not adhere sufficiently to the surface thereof. In order to overcome these problems, the surface of polyolefin films/sheet have frequently been subjected to various treatments such as eg a corona discharge treatment. Such treatments improve ink laydown and adhesion sufficiently to provide a useful material. However, the material so treated lacks absorption and requires specialised printing techniques and thereby restricts their use.

Lack of absorption of such films/sheets has been overcome by applying on a laminated film a coating comprising an absorbent filler and an adhesive binder during the manufacturing process. One such process is described in EPA-367613 where up to 5% by weight of a filler such as silica is used to produce a synthetic paper or a packaging film. The amount of filler is kept relatively low since such films and sheets when used as packaging films have to be capable of being heat-sealed. The presence of higher amounts of such fillers would result in a film which has a disrupted and comparatively rough surface and will adversely affect the heat-sealability of the film. The absorbancy of the surface layer is usually improved by applying a coating of the absorbent on the surface of the sheet or film. However, such coatings are inconvenient and expensive to apply and require a separate manufacturing process facility. Such a process also renders the surface so treated susceptible to the adverse effects of water and solvents. The interface between the applied coating and the filmsheet is a source of weakness since the adhesion is frequently weaker here than the cohesion of the original film/sheet. Furthermore, the coated surface itself can be susceptible to yellowing when exposed to light.

In some instances, such as eg in DE-A-2231718, a filler such as silica or kaolin is mixed with a polymer melt and the mixture is melt-extruded into a single layer film. In these cases, the silica is present in the core of the film so produced thereby adversely affecting the dimensional stability of the product.

Other attempts to improve the properties of the surface layer by sequential extrusion are also known. GB-A-2099754, for instance, describes a product which has at least four layers. This product is produced by coextruding a three-layer core which is uniaxially oriented in the machine direction and then a surface layer with a relatively high filler content is melt-extruded on to at least one side of the core and the whole four- or five-layer structure is then stretched in the cross direction. This is a complex process since it does not involve simultaneous co-extrusion or biaxial stretching of all the layers.

It has now been found that these problems can be mitigated by the coextrusion of sheet comprising two layers in a simple one-stage process.

Accordingly, the present invention is a co-extruded film or sheet comprising a base layer and at lease one surface layer, characterised in that the base layer comprises a polyolefin and has a thickness greater than about 10 $\mu$m, and the surface layer comprises a polyolefin and a silica filler and has a thickness less than about 50 $\mu$m, said surface layer containing from 10 to 60% w/w of silica based on the polyolefin content of said surface layer.

The base layer in the co-extruded film or sheet comprising polyolefins may have other components therein such as pigments, fillers, resinates, rubbers and the like. Thus the base layer may be of any composition such as is described in our prior published GB-A-1470372 and GB-A-1492771. More preferably, the base layer comprises a blend of an orientable thermoplastic polyolefin with at least one metal resinate which is about 2–50% w/w calculated on this blend. The metal resinate preferably forms, at least in part, a separate phase uniformly distributed within the polyolefin and the total blend is capable of being extruded as to form a layer and being stretched which may or may not be of a voided structure. More preferably, the base layer comprises a blend of a high density polyethylene and a calcium-zinc resinate within the aforementioned range. In a preferred embodiment, the base layer suitably has the following composition (Table 1):

TABLE 1

BASE LAYER COMPOSITION

| Component | Parts by weight |
| --- | --- |
| High density polyethylene (copolymer) | 100 |
| Calcium-zinc resinate | 5–15 |
| Polystyrene | 4.5–5.5 |
| High density polyethylene (homopolymer) | 17.5–21 |
| Calcium carbonate filler | 15–25 |
| Titanium dioxide | 5–10 |
| Styrene-butadiene copolymer | 0–1.0 |
| Calcium oxide | 0.4–1.0 |

The above base layer composition may contain other additives such as eg an antioxidant and a lubricant. It is, however, preferable to incorporate an antioxidant in one or more of the surface layers.

The term high density polyethylene as used above and throughout the specification is meant to include, unless otherwise specified, polymers and copolymers of ethylene with minor amounts of other a-olefin monomers as is commonly understood in the industry and as described in the above-mentioned GB-A specifications. The term also includes mixtures of high density polyethylenes.

The thickness of the base layer is greater than about 10 μm, and is suitably greater than about 40 μm and is preferably in the range from about 45–500 μm.

The co-extruded film or sheet has one or more surface layers. Where there is more than one surface layer, the base layer is sandwiched therebetween. The surface layer of the co-extrudate is capable of receiving print and is the so called "external printable layer" which comprises a polyolefin and silica. The polyolefin is suitably polyethylene but may comprise a mixture of olefin polymers. In such a product the base (middle) layer of the so called "sandwich" is a filled, voided layer.

By "external printable layer" is meant here and throughout the specification that said surface is textured or modified by the presence of a pigment and/or a filler and/or a resin and has a printability corresponding to a wettability of at least 40 dynes/cm.

The silica content of the surface layer is in the range from about 10 to 60% w/w, preferably from 20–60% w/w of the polyolefin. This silica can be supplemented with the fillers and pigments normally used in such printable surface layers. The silica used is suitably fine silica having a particle size in the range from about 0.01 to 10 μm, and is preferably a particle size from 1 μm to about 5 μm.

Thus, in a preferred embodiment, the surface layer, which is preferably opaque, suitably has the following composition (Table 2):

TABLE 2

SURFACE LAYER COMPOSITION

| Components | Parts by weight |
| --- | --- |
| High density polyethylene copolymer | 100 |
| Linear low density polyethylene | 0–43 |
| Low density polyethylene | 3–11 |
| Polystyrene | 0–25 |
| Styrene-butadiene copolymer | 0–4 |
| Polypropylene/propylene copolymer | 0–16 |
| Pigment/filler | 22–50 |
| Silica | 10–60 |

The thickness of the surface layer is below 50 μm, is suitably below 10 μm and is preferably from about 1 to 8 μm.

The above surface layer composition may also include other additives such as eg a lubricant (0–0.4% w/w); a wax, stearic acid or a metal stearate, especially calcium stearate; and an antistatic agent (0–2% w/w, preferably 0.5–1.5% w/w based on the weight of the principal polyolefin component of the composition) of the ethoxylated amine type.

The presence of fillers and/or pigments in the surface layer(s) provides a better grip during stretching of the co-extruded layers.

The composition used for the surface layer is suitably prepared by the method described in the Examples below. The polyolefin used in the surface layer is suitably the same as or very similar to the polyolefin predominantly present in the base layer so that there is substantially no uneven expansion or contraction at the co-extrusion or stretching temperatures used. This has the further advantage that direct melt-bonding between the adjacent polymers can be achieved thereby obviating the need to use any intermediate bonding layers or tie layers.

The base layer and one or more of the surface layers are co-extruded using co-extrusion equipment known in the plastics industry which may comprise one extruder for the composition employed to generate each layer and is adapted to feed a co-extrusion die fitted eg with appropriate flow distribution control or to feed a conventional die via an appropriate distributor block. More preferably, the co-extruded film or sheet comprising eg three layers with the base layer being sandwiched between two surface layers is made in a single step using separate extruders for the base and surface layers but using a single die block.

The co-extruded film or sheet so formed may be oriented by stretching in a uniaxial or biaxial direction(s) according to known methods. It is preferable to orientate the film/sheet by simultaneous biaxial stretching. Such orientation may be achieved eg by co-extruding the layers in the form of a tube and inflating it in a known manner. However, to achieve a flat laying product, the layers are preferably co-extruded to form a continuous sheet or web which is then stretched employing a flat-bed stretching apparatus preferably of the type described in our prior published GB-A-1374574 and GB-A-1442113. Stretching of thermoplastic webs using such apparatus is described in our prior published GB-A-1490512. The methods described in these publications are incorporated herein by reference.

The co-extruded plastics film or sheet according to the present invention may be subjected to various treatments and surface coatings eg to enhance antistatic and printing qualities. It will be understood, however, that the surface layer destined to provide an external printable surface will usually be subjected to surface treatment such as oxidation via flame or corona discharge treatment to provide a more polar surface and the required wettability to more readily accept inks and coatings. Clearly, such treatments may be applied to the surface of a surface layer, when such a layer is co-extruded to form the film or sheet.

Coatings that may be applied to the co-extruded sheet or film include aqueous coatings commonly used in the paper industry and especially latex-based coatings. Of particular value in the present context, however, are the coatings described in our prior published GB-A-2177413 as hereinbefore mentioned. It will be appreciated that adhesive coatings such as pressure sensitive and heat activable coatings may be alternatively or additionally applied to the surface of the co-extruded film or sheet as may be desirable for particular uses.

A particular feature of the present invention is that the films and sheets thus produced:

(i) are integral, (ii) have improved dimensional stability, (iii) have enhanced printability due to the presence of silica in the outer layer, (iv) can give improved key to further applied coatings, (v) have a voided base layer, (vi) have mechanical properties determined by the central thicker layer which may be substantially non-absorbent, and (vii) use a simple co-extrusion process with a simultaneous biaxial orientation.

The present invention is further illustrated with reference to the following Example:

EXAMPLE 1

The following composition was used to produce Compound "A" (used in the production of the core material):

TABLE 3

| Component | Parts by Wt |
|---|---|
| Rigidex ® 002/55 HDPE copolymer (MFI 0.2 g/10 min & density 0.955 Kg/m$^3$, ex BP Chemicals Ltd) | 100 |
| Rigidex ® HD6070EA HDPE (MFI 7.5 g/10 min & density 0.96 Kg/m$^3$, ex BP Chemicals Ltd) | 17.6 |
| Polystyrene Grade HF888 (ex BP Chemicals Ltd) | 4.8 |
| Ennesin ® ZC14 (Ca-Zn resinstate, ex Wolstenholme Ltd) | 9.6 |
| Cariflex ® TR1102 Styrene-butadiene-styrene copolymer (ex Shell UK Ltd) | 0.6 |
| Anhyd. CaCO$_3$ (2.5$\mu$ particle size, ex Wolstenholme) | 21.0 |
| TiO$_2$ (Rutile) RCR2 (ex Wolstenholme Ltd) | 5.8 |
| Armostat ® 400 (antistat, ex Akzo Chemicals Ltd) | 0.14 |
| Armostat ® 375D (antistat, ex Akzo Chemicals Ltd) | 0.35 |
| Caloxal ® CPA (CaO, ex Sturge Lifford Ltd) | 0.58 |
| Calcium Stearate (ex RTZ Chemicals Ltd) | 0.04 |
| Irganox ® B215 (antiox., ex Ciba-Geigy Ind Ltd) | 0.29 |

HDPE - High density polyethylene
MFI - Melt flow index

Compound "A" was prepared from the above components as follows:

Separate, melt blended, cooled and diced masterbatches (A1 and A2) were obtained from the above with the calcium carbonate and titanium dioxide respectively and comprised:

TABLE 4

| A1 | | A2 | |
|---|---|---|---|
| Calcium carbonate | 60% w/w | Titanium dioxide | 60% w/w |
| Rigidex ® HD6070EA | 39.6% w/w | Rigidex ® HD6070EA | 39.6% w/w |
| Armostat ® 400 | 0.4% w/w | Calcium Stearate | 0.4% w/w |

Masterbatches A1 and A2 were then intermixed in appropriate proportions with the remainder of the ingredients of the composition and fed to a compounding extruder.

The composition was melt blended at approximately 200° C., extruded, cooled and diced to form Compound A.

A further Compound "B" was made from Sylobloc® 47 (an amorphous silica, 40% w/w, particle size 4.0–5.2 $\mu$, ex W R Grace & Co) which was dispersed in Rigidex® HD 6070EA (HDPE, 60% w/w, ex BP Chemicals Ltd). To facilitate dispersion, the Sylobloc® 47 was first coated with a proprietary dispersing agent Coatex® DOPP-18 (ex Croxton & Garry). The dispersion of silica and HDPE was formed into pellets using a conventional extruder and pelletiser.

Compound "A" was fed to an in-line extruder of a twin extruder-distributor-sheeting die co-extrusion arrangement and Compound "B" was mixed with an equal proportion of Rigidex® HD 6070EA and fed to a secondary extruder. The sheeting die and distributor were of conventional type enabling a three-layer co-extrudate to be produced continually comprising a layer of Compound "B" on each side of a layer of Compound "A".

The extruders were arranged to enable each to form and feed a substantially homogeneous melt into the distributor which was maintained at a temperature of 210° C. The die lips were adjusted to approximately 5 mm and the flow of each of the melts was adjusted to give a composite layered extrudate about 395 mm wide at an extrusion rate of 360 Kg/hr.

The composite extrudate was then fed directly onto and around a set of cooling and conditioning rollers running at a peripheral speed whereby the core material was brought to a temperature of approximately 122° C. and the outer layers each to a temperature of approximately 118° C. This resulted in a conditioned composite extrudate having an overall thickness of 1.5 mm, a core thickness of 1.32 mm and two outer layers each being about 0.09 mm thick.

The thus conditioned composite extrudate was then fed into a simultaneous biaxial stretching apparatus of the type described in our published GB-A-1442113 with reference to FIGS. 1 to 9 of that publication and arranged to provide a 4:1 stretch in each of the longitudinal or machine direction (MD) and transverse direction (TD).

The stretching apparatus was provided with a four zone circulating air oven, the zones comprising preheat Zone 1, preheat Zone 2, stretching Zone 3 and annealing Zone 4. The temperatures and lengths of the respective zones and the sheet speed are tabulated below in Table 5:

TABLE 5

| Zones | Temperature (° C.) | Length (meters) | Speed in (meters/min) | Speed out (meters/min) |
|---|---|---|---|---|
| Zone 1 | 139 | 1.0 | 10.4 | — |
| Zone 2 | 138 | 1.0 | — | — |
| Zone 3 | 130 | 1.5 | — | 43.8 |
| Zone 4 | 115 | 2.0 | — | 43.8 |

The web gripping devices which were initially at a pitch of about 38 mm were heated to approximately 120° C. prior to contacting the sheet.

The composite plastics film thus produced and having an average thickness of 0.094 mm and nominal substance of 75 gsm was cooled, edge trimmed and passed through a corona discharge treatment unit adjusted to give a treatment level such that the wettability of the surface of each outer layer was greater than 40 dynes/cm and then reeled.

The wettability of the product was determined by the application of Sherman Surface Tension INk 45 dynes/cm, formulated to demonstrate a wettability of at least 45 dynes/cm.

The production equipment remained clear of undesirable deposits and the product was dust free.

The resultant composite plastics film had a paper like feel and of particular note was the IGT test which uses an IGT Printability tester A2-3 and measures the elongation of a 0.006 ml drop of dibutyl phthalate when transferred to a test strip of material by a rotating aluminium roller; the shorter the length of the oil trace on the test strip, the more absorbent the substrate. This oil absorption test on the plastics films of the present invention gave dry traces below 9 cm in length. Uncoated plastics film made in a similar way but with no silica in the formulation gave IGT oil absorption of about 11 cm and failed to dry over several hours.

The composite plastics films of the present invention could be readily printed upon using conventional lithographic and gravure printing techniques.

The physical properties of the composite plastics films of the present invention thus produced were as follows:

TABLE 6

| Substance (g/m$^2$) | 75 |
|---|---|
| Thickness | 94$\mu$ |
| Tensile Strength (N/mm$^2$) | |
| MD | 35.9 |
| TD | 33.4 |
| Elongation at Break (%) | |
| MD | 156 |
| TD | 191 |

TABLE 6-continued

| Stiffness (Kg/m) | |
|---|---|
| MD | 2.5 |
| TD | 2.4 |
| Surface Cohesion (N/25 mm) | |
| Face A | 7.5 |
| Face B | 7.7 |
| Brightness (ISO2470) (%) | 85.1 |
| Opacity (%) | 84.8 |
| IGT Oil Absorption (cm) | |
| Face A | 8.7 |
| Face B | 8.6 |

I claim:

1. A coextruded film or sheet comprising a base layer and at least one surface layer, wherein
   a) the base layer comprises a blend of an orientable thermoplastic olefin polymer with at least one metal resinate which is in an amount of from 2 to 50% w/w calculated on the blend which is voided, and the base layer has a thickness greater than 10 μm, and
   b) the surface layer comprises a polyolefin and a silica filler coated with a dispersing agent, said surface layer having a thickness less than 50 μm and containing from 10 to 60% w/w of a silica filler based on the polyolefin content of said surface layer.

2. A film or sheet according to claim 1 wherein the base layer comprises for every 100 parts by weight (p.b.w.) of high density polyethylene copolymer, from 5–15 p.b.w. of calcium-zinc resinate, from 4.5–5.5 p.b.w. of polystyrene, from 17.5–21 p.b.w. of high density polyethylene homopolymer, from 15–25 p.b.w. calcium carbonate filler, from 5–10 p.b.w. titanium dioxide, from 0–1.0 p.b.w. of styrene-butadiene copolymer, and from 0.4–1.0 p.b.w. of calcium oxide.

3. A film or sheet according to claim 1 wherein the surface layer comprises for every 100 parts by weight (p.b.w.) of high density polyethylene copolymer, from 0–43 p.b.w. of linear low density polyethylene, from 3–11 p.b.w. of low density polyethylene, from 0–25 p.b.w. polystyrene, from 0–4 p.b.w. of styrene-butadiene copolymer, from 0–16 p.b.w. polypropylene/propylene copolymer, from 22–50 p.b.w. of pigment/filler, and from 10–60 p.b.w. silica.

4. A film or sheet according to claim 1 wherein the surface layer has been modified by the presence of at least one of a pigment, filler, or resin and has a printability corresponding to a wettability of at least 40 dynes/cm.

5. A film or sheet according to claim 1 wherein the base layer comprising polyolefins comprises in addition at least one of pigments, fillers, resinates, and rubbers.

6. A film or sheet according to claim 1 wherein the metal resinate in the base layer forms, at least in part, a separate phase uniformly distributed within the polyolefin and the total blend is capable of being extrded as to form a layer and being stretched.

7. A film or sheet according to claim 1 wherein the base layer comprises a blend of a high density polyethylene and a calcium-zinc resinate.

8. A film or sheet according to claim 1 wherein the thickness of the base layer is greater than about 10 μm.

9. A film or sheet according to claim 1 wherein the co-extruded film or sheet has more than one surface layer.

10. A film or sheet according to claim 9 wherein said film or sheet comprises two surface layers and a base layer sandwiched therebetween.

11. A film or sheet according to claim 1 wherein the base layer and/or the surface layer contain in addition an anti-oxidant and a lubricant.

12. A film or sheet according to claim 1 wherein the silica content of the surface layer is in the range from about 20–60% w/w of the polyolefin.

13. A film or sheet according to claim 1 wherein the silica is a fine silica having a particle size in the range from about 0.01 to 10 μm.

14. A film or sheet according to claim 1 wherein the thickness of the surface layer is below 10 μm.

15. A film or sheet according to claim 1 wherein the co-extruded film or sheet is oriented by simultaneous biaxial stretching.

16. A film or sheet according to claim 1 wherein the surface of said film or sheet is subjected to oxidation via flame or corona discharge treatment to provide a polar surface and sufficient wettability to readily accept inks and coatings.

17. A film or sheet according to claim 1 wherein one or more coatings selected from the group consisting of latex coatings, adhesive coatings, pressure sensitive coatings and heat activable coatings are applied to the surface of the co-extruded sheet or film.

18. A method of making a film or sheet having: (a) a base layer comprising a blend of an orientable thermoplastic olefin polymer with at least one metal resinate which is in an amount of 2 to 50% w/w calculated on the blend which is voided and has a thickness greater than 10 μm, and (b) a surface layer comprising a polyolefin and a silica filler and which has a thickness less than 50 μm, which method comprises first forming a pellet from a dispersion of a polyolefin and from 10 to 60% w/w of a silica filler based on the polyolefin content of the surface layer, and thereafter coextruding said base layer and said surface layer to form said sheet or film.

19. A method defined in claim 18 wherein the base layer comprises a blend of high density polyethylene and a calcium-zinc resinate.

20. A method defined in claim 18 wherein the surface layer has a printability corresponding to a wettability of at least 40 dynes/cm.

21. A method defined in claim 18, wherein the surface layer formed is subjected to exidation via flame or corona discharge treatment to provide a polar surface and sufficient wettability to readily accept inks and coatings.

* * * * *

UNITED STATES PATENT AND TRADEMARK OFFICE
CERTIFICATE OF CORRECTION

PATENT NO. : 6,025,058
DATED : February 15, 2000
INVENTOR(S) : JOHN VICTOR SHEPHERD It is certified that error appears in the above-identified patent and that said Letters Patent is hereby corrected as shown below:

Title should read --MULTILAYER SYNTHETIC PAPER COMPRISING POLYOLEFIN--.

Column 1, line 66, change "filmsheet" to --film/sheet--.

Column 3, line 2, change "a-olefin" to --α-olefin--.

Column 5, Table 3, fourth item listed, change "resinstate" to --resinate--.

Claim 6, line 4, change "extrded" to --extruded--.

Claim 21, line 2, change "exidation" to --oxidation--.

Signed and Sealed this

Twenty-eighth Day of November, 2000

Attest:

Q. TODD DICKINSON

*Attesting Officer*    *Director of Patents and Trademarks*